March 30, 1948.  C. G. STRANDLUND  2,438,625
LATERALLY ADJUSTABLE GANG PLOW
Filed April 1, 1944  3 Sheets-Sheet 1
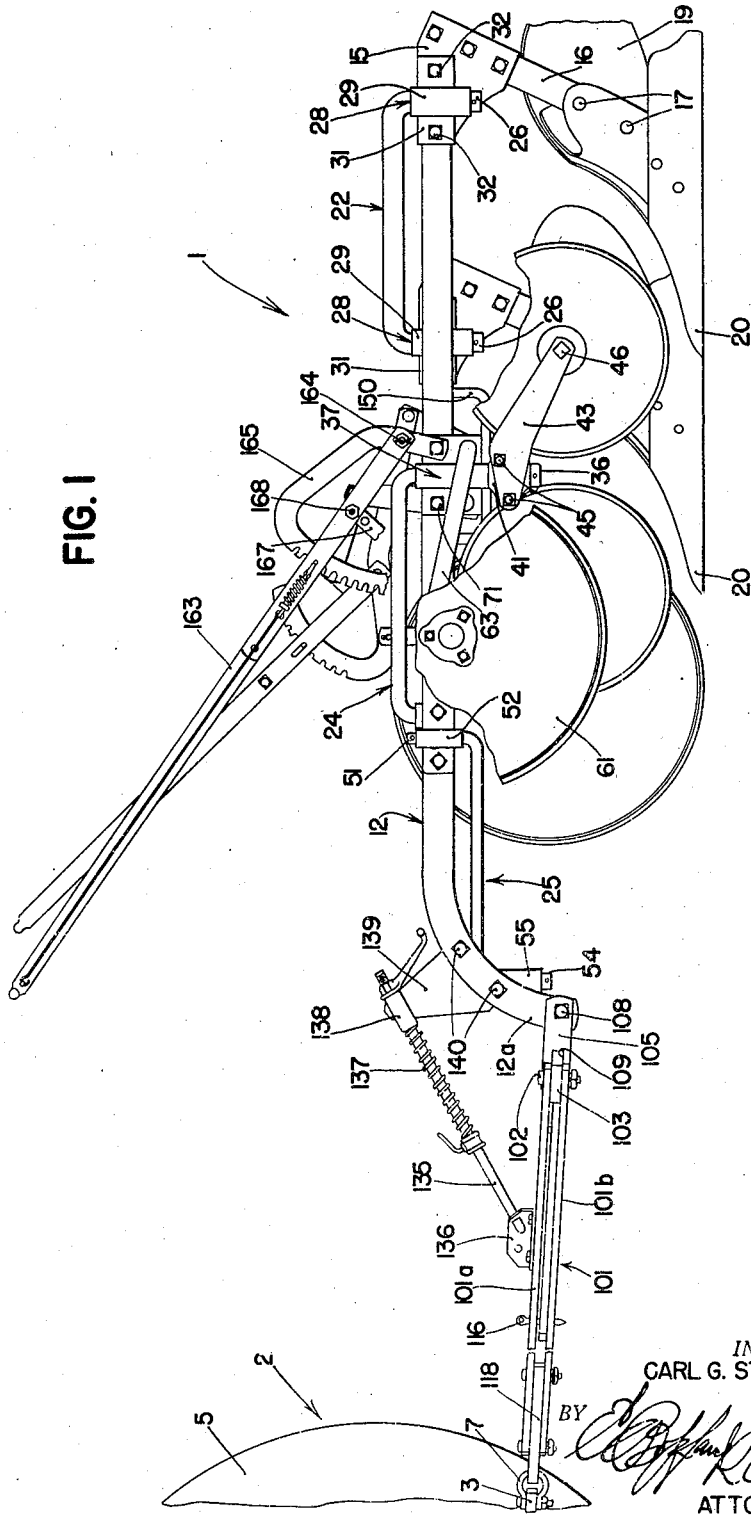
FIG. I
INVENTOR.
CARL G. STRANDLUND
BY
ATTORNEYS

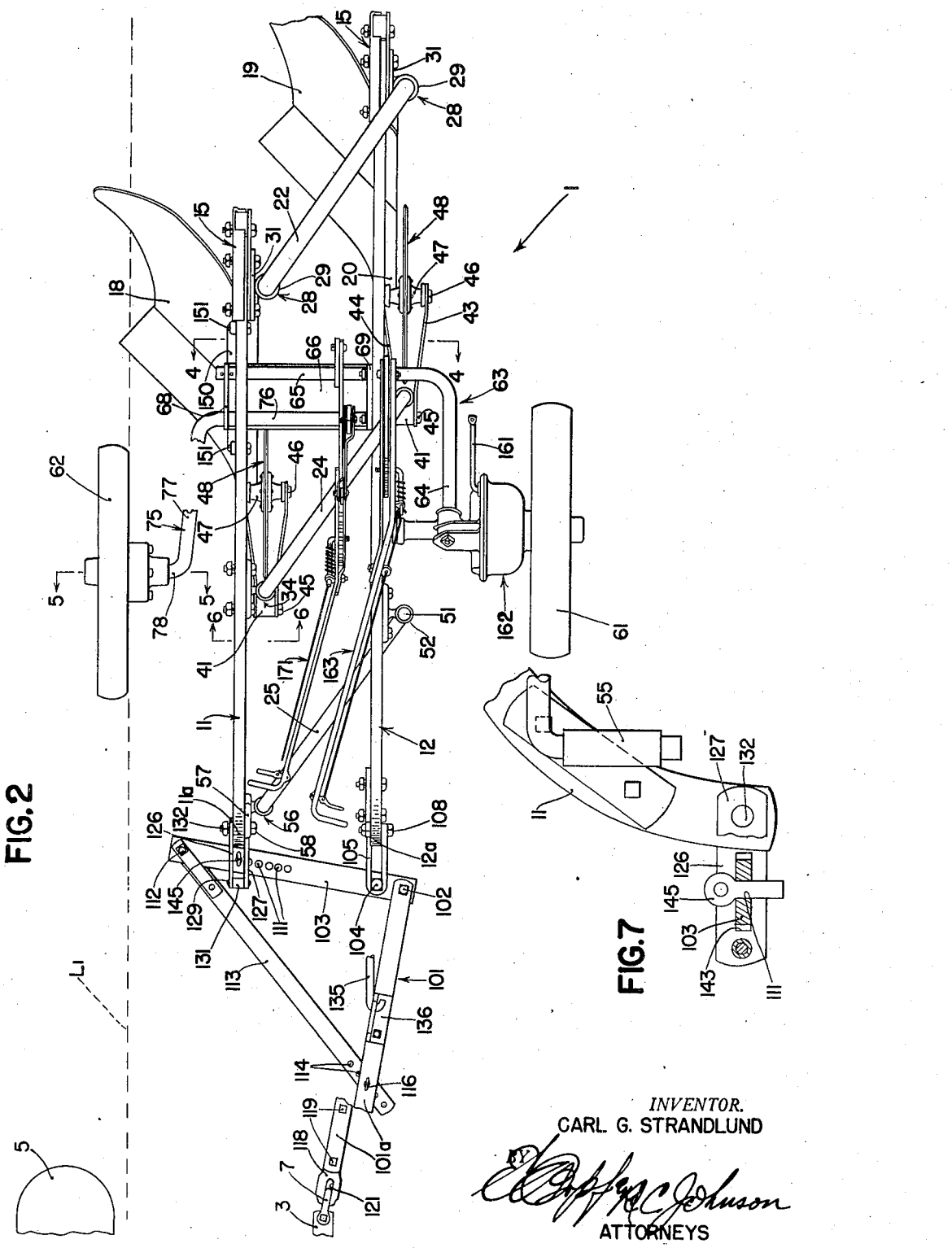

March 30, 1948.  C. G. STRANDLUND  2,438,625
LATERALLY ADJUSTABLE GANG PLOW
Filed April 1, 1944  3 Sheets-Sheet 3
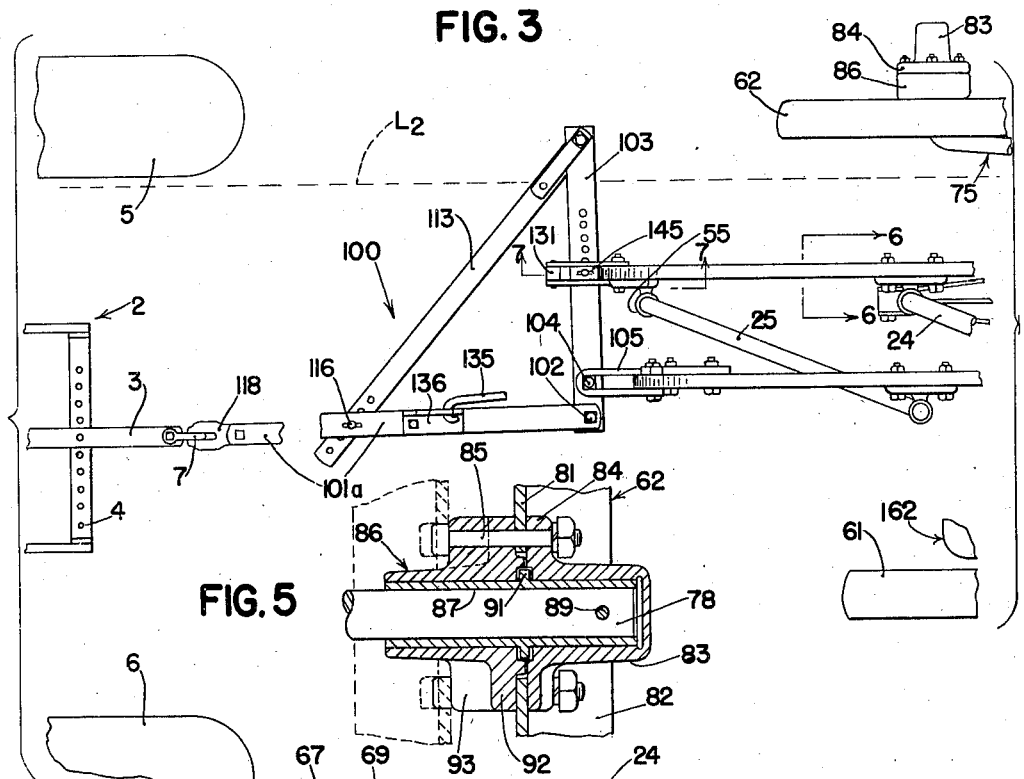
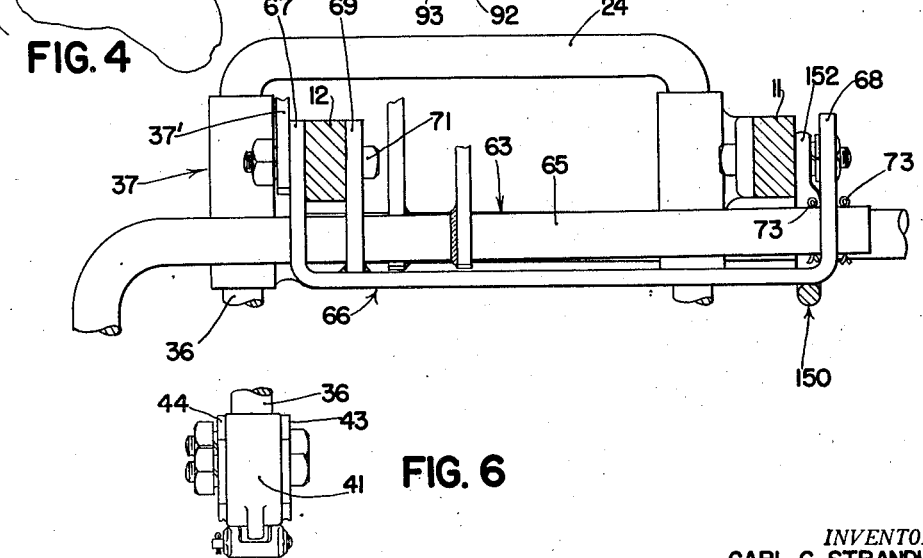
INVENTOR.
CARL G. STRANDLUND
ATTORNEYS Patented Mar. 30, 1948

2,438,625

UNITED STATES PATENT OFFICE 2,438,625

LATERALLY ADJUSTABLE GANG PLOW

Carl G. Strandlund, Moline, Ill., assignor to Deere & Company, Moline, Ill., a corporation of Illinois Application April 1, 1944, Serial No. 529,160

5 Claims. (Cl. 97—97)

The present invention relates generally to agricultural implements and particularly to such trailing implements as plows and the like adapted to be towed by a farm tractor.

The object and general nature of the present invention is the provision of an agricultural implement, such as a gang plow, wherein means is provided for shifting the plow beams laterally, one with respect to the other, so as to vary the width of cut and/or to accommodate arranging the plow to receive different sizes of plow bottoms.

One important feature of the present invention is the provision of a plow of this type in which swinging links or bails are connected with the two plow beams and arranged at such an angle that ample clearance is maintained between the plow bottoms, whether the latter be of the large size or of a small size. More particularly, it is a feature of this invention to provide swinging connections between the beams arranged, in connection with a hitch structure, so that the lateral position of the latter is varied to correspond to the width of cut desired and/or the size of bottoms with which the plow is equipped. Specifically, it is a feature of this invention to correlate the swinging of the hitch structure with the adjustment of the plow beams so that the right rear wheel of the tractor may always run in the previously opened furrow and the plow is disposed in the proper relation with respect to the previously opened furrow. Additionally, it is a more or less specific feature of the present invention to provide for varying the lateral spacing between the plow beams and, correlated therewith, varying the lateral position of the front end of the hitch structure by an amount that is substantially twice the variation in the beam spacing, where the plow is a two bottom plow.

A further feature of this invention is the provision of a plow frame of the adjustable type, wherein the ground wheel crank axles are connected for rocking movement with one of the plow beams and the other plow beam mounted for lateral movement toward and away from said one plow beam and relative to the crank axles, and a further feature of the invention in this connection is the provision of means for adjusting the wheel laterally at the side of the plow carrying the laterally adjustable plow beam.

These and other objects and advantages of the present invention will be apparent to those skilled in the art after a consideration of the following detailed description, taken in conjunction with the accompanying drawings, in which a preferred embodiment of the present invention has been illustrated.

In the drawings:

Figure 1 is a side view of a plow in which the principles of the present invention have been incorporated.

Figure 2 is a plan or overhead view of the plow shown in Figure 1, the plow being shown in its widest spacing, accommodating the larger sizes of plow bottoms.

Figure 3 is a fragmentary view similar to Figure 2, showing the arrangement of the plow beams when the plow is adjusted to accommodate the smaller sizes of plow bottoms or, when employing the larger sizes of plow bottoms, to provide for reducing the width of cut.

Figure 4 is a sectional view taken generally along the line 4—4 of Figure 2 but at a larger scale, illustrating the manner of connecting the swinging bails or links with the plow beams.

Figure 5 is a section, also at a larger scale, taken generally along the line 5—5 of Figure 2 and illustrating the optional positions of the furrow wheel.

Figure 6 is a view taken generally along the line 6—6 of Figures 2 and 3, showing the particular way of mounting the coulters on the lower ends of one of the swinging bails or links.

Figure 7 is a fragmentary section taken along the line 7—7 of Figure 3.

Referring now more particularly to Figures 1 and 2, the plow of the present invention, indicated in its entirety by the reference numeral 1, is adapted to be hitched to a tractor 2 having a drawbar 3 connected to the tractor and carried by means of a drawbar support 4. The tractor also has right and left rear wheels 5 and 6, and the rear end of the tractor drawbar 3 carries a clevis 7.

The plow 1 comprises right and left hand plow beams 11 and 12 of the flat beam type, the rear end construction of each beam, as best shown in Figure 1, including a bracket 15 bolted to the main beam and a downwardly and forwardly extending standard 16 to which the associated plow bottom is secured, as by bolts 17. The right hand bottom is indicated by the reference numeral 18 and the left hand bottom is indicated by the reference numeral 19 but generally both bottoms are identical. The plow beam 11 is shorter than the plow beam 12 so as to dispose the right hand plow bottom 18 in advance of and to the right of the left hand plow bottom 19, each plow bottom having a point 20, and a line connecting said points extends generally at an angle to the plow beams 11 and 12. A plurality, preferably three, bails or links, indicated by the reference numerals 22, 24 and 25 are arranged to connect the plow beam 11 to the plow beam 12 so that the former may be swung toward or away from the beam 12. Referring first to the rear bail or link 22, it will be observed that this member is somewhat larger than the other or forward bails and that both of the bails or links 22 and 24 consist of U-shaped members that are mounted with their intermediate sections upwardly while their ends extend downwardly. As best shown in Figure 1, the ends 26 of the rear bail 22 are received in bearing brackets 28 and each of the bearing brackets includes a vertical sleeve or bearing section 29 secured in any suitable way, preferably by welding, to an attaching plate 31 suitably apertured so as to be bolted or otherwise secured, as at 32, to the rear ends of the plow beams 11 and 12, preferably against the connecting beam brackets 15. The bail or link 24 is similarly connected with the plow beams, the forward or right hand downwardly extending end being mounted for rocking movement in a bearing bracket 34 which is substantially identical for all practical purposes with the bearing bracket 28 described above. The rear or left hand end 36 (Figures 1, 4 and 6) extends downwardly of the bearing bracket 37 in which it is mounted by a considerable extent, thus serving as a vertical spindle section to which is secured a coulter bracket 41 best shown in Figure 6. The coulter bracket 41 is in the nature of a bushing and is mounted for lateral rocking movement on the lower end 36 of the bail 24. The coulter bracket 41 serves as a coulter yoke bearing to receive a pair of plates 43 and 44 which at their forward ends are bolted, as at 45, to opposite sides of the coulter yoke bearing 41. The rear ends of the coulter yoke plates 43 and 44 extend downwardly and rearwardly and are apertured to receive a bolt 46 or the like on which the bearing means (not shown) is mounted, said bearing means receiving the hub 47 of the coulter 48 (Figure 2).

In a similar way, the lower right or forward end of the bail 24 is extended downwardly to form a coulter-receiving vertical spindle section which receives and supports a coulter and coulter-supporting parts that are substantially identical with those just described. Hence the same reference numerals have been employed. Since the bails, particularly the bail 24, are disposed in a line parallel with the line connecting the plow points 20, each of the coulters 48 is disposed in exactly the same position relative to the associated plow bottom in all positions of adjustment of the plow beams.

The forward bail 25 at its left or rear end is provided with an upturned portion 51 rockably received in a bail bearing 52 bolted to the forward portion of the left-hand plow beam 12. As will be seen from Figures 1 and 2, each of the plow beams 11 and 12 is formed to extend downwardly and forwardly at its front end, as indicated at 11a and 12a, and to the lower ends of these portions of the plow beams suitable hitch structure, which will be described below, is connected. The front or right end of the forward link or bail 25 is formed to extend downwardly, as indicated at 54 in Figure 1, and this downturned bail end is mounted in a sleeve 55 forming a part of a forward bail bracket 56. This bail bracket or bail bearing is substantially the same as the other bail bearings just described except that the plate section 57 thereof is disposed at an angle to the vertical sleeve section 55 thereof, due to the fact that the plate section 57 is secured, as by bolts 58, to the downwardly curved portion 11a of the right hand plow beam 11.

The plow 1 is equipped with a land wheel 61 and a furrow wheel 62. The land wheel 61 is mounted on the driving part of the self-interrupting clutch unit indicated in its entirety by the reference numeral 162 and which is carried on the forward end of a land wheel crank axle 63. The crank axle 63 includes a swinging section 64 on which the clutch unit 162 is mounted and a journal section 65 that is mounted for rocking movement in a generally transversely extending bracket or brace 66. The member 66 preferably is formed of flat stock having upturned ends 67 and 68 apertured to receive and form bearings for the journal section 65 of the land wheel crank axle. Welded to the intermediate portion of the transverse member 66 is a plate 69 (Figure 4), and between the upturned end 67 and the plate 69 the left hand plow beam 12 is disposed. The parts are apertured to receive bolts 71 for holding the various parts together, and preferably, the bolts 71 are also employed for securing the plate section 37' of the bail bearing member 37 to the beam 12. The right end of the journal section of the land wheel crank axle 63 is received in an aperture formed in the upturned end 68, and the crank axle is held in place against lateral displacement by any suitable means, such as cotters 73. The furrow wheel crank axle is indicated in its entirety by the reference numeral 75 and includes a journal section 76 mounted for rocking movement in suitable apertures formed in the upturned end 68 and the parts 67 and 69, the swinging section 77 of the furrow wheel crank axle terminating in an end 78 on which the furrow wheel 62 is mounted for rotation. The furrow wheel 62 is of particular construction. As best shown in Figure 5, the furrow wheel includes a disk or web 81 formed peripherally with a tread section 82 and a hub section 83 having an apertured flange 84 through which the clamping bolts 85 are disposed. The wheel 62 also includes a second flanged hub section 86, both hub sections 83 and 86 being mounted by a bearing sleeve 87 on the crank axle end 78. The bearing sleeve 87 is connected to the crank axle by a bolt or pin 89 and is provided with a rib 91 which, being disposed between the hub sections 83 and 86, prevent the wheel from shifting laterally. The flange 92 of the hub section 86 is provided with bosses 93 through which the bolts 85 extend, and these boss sections provide in effect a fairly thick flange so that by disposing the wheel web and rim section 81, 82 either on one side or the other of the flange 92, particularly by turning the rim 82 toward one side or the other, the lateral position of the tread part of the wheel may be varied a considerable extent. This is done so that the furrow wheel 62 may be disposed fairly close to the laterally shiftable beam 11, as will be explained in detail below.

The hitch structure of the plow is indicated in its entirety by the reference numeral 100 and comprises a draft bar 101, pivoted by a bolt 102 or the like, to a cross bar 103. A U-shaped hitch clevis 105 is pivoted, as by a pivot bolt 106, to the downturned front end 12a of the left hand beam 12, the hitch clevis being slotted, as at 109, to receive the cross bar 103 to which it is connected by a pivot bolt 104 (Figure 2). The other end of the cross bar 103 is provided with a plurality of holes 111 and at its outermost end is apertured to receive a bolt 112 by which the rear end of the brace bar 113 is connected thereto. The forward end of the brace 113 is provided with a plurality of holes 114 and passes between the two bars 101a and 101b (Figure 1) making up the draft bar 101. A pin 116 is placed in suitable openings in the bars 101a and 101b and in one or the other of the openings 114 in the brace bar 113, according to the width of the tractor to which the plow is connected. A hitch drawbar link 118 (Figure 1) is bolted, as at 119, to the front end of the drawbar 101 and has its front end slotted, as at 121, to receive the tractor drawbar clevis 7. A pair of clevis plates 126 and 127 are bolted or riveted together as at 129 (Figure 2), with a bushing 131 therebetween, and the rear ends of the clevis plates 126 and 127 are pivoted, as by a pivot bolt 132, to the front downturned end of the right hand plow beam 11. The bolts 119 and 132 are in line, forming the axis about which the hitch structure 100 may swing relative to the plow beams. Such swinging movement is, however, restrained by a rod 135 pivoted to the bracket 136 that is secured to the draft bar 101 and connected through a compression spring 137 and a swivel 138 to a bracket 139 bolted at 140 to the right hand plow beam 12, as best shown in Figure 1. As best shown in Figure 7, the clevis plates 126 and 127 are slotted, as at 143, and the right end of the crossbar 103 extends through the slots 143, as best shown in Figure 2. A block or pin 145 is adapted to fit between the clevis plates 126 and 127 (Figure 2) and to be received in one of the openings 111 in the crossbar 103. As long as the pin or block 145 is in position between the clevis plates, any movement of the plow beam 11 toward or away from the plow beam 12 is prevented, and therefore as long as movement of the plow beam 11 toward the plow beam 12 is prevented, there can likewise be no fore and aft movement of one plow beam relative to the other. Therefore, draft applied to the front end 118 of the hitch is transmitted directly to both of the plow beams 11 and 12. For the purpose of holding the plow beam 11 connected for lateral movement to the transverse bracket 66, a hanger 150 is arranged to extend underneath the right end of the bracket 66, as best shown in Figures 1 and 4, and is secured at its upper fore and aft spaced ends to the plow beam 11 by bolts 151. Preferably, the ends of the hanger 150 receiving the bolts 151 are flattened, as indicated at 152 in Figure 4.

The operation of the plow described above is substantially as follows.

The parts when they are arranged as shown in Figure 2 accommodate the wider plow bottoms, and by way of example I have shown the plow bottoms 18 and 19 of a size that is usually employed for cutting a furrow slice of 14 inches, that is, a total width of cut of 28 inches. When arranged in this manner, the furrow wall of the previously opened furrow is indicated by the line $L^1$. The length and angularity of the parts making up the hitch structure 100 are so constructed and arranged that when the plow beams 11 and 12 occupy the relative positions shown in Figure 2, the front end 118 of the hitch is in such a position that, with the right rear tractor wheel 5 in the previously opened furrow and against or close to the furrow wall indicated by the line $L^1$, the hitch part 118 is in a position to be connected to the drawbar 3 of the tractor, preferably with the latter in the middle of the tractor. In this position, the furrow wheel 62 is in a position to pass along the furrow wall $L^1$ quite closely adjacent thereto. Now assuming that it is desired to reduce the width of cut, either by undercutting with both of the plow bottoms 18 and 19 or by replacing the plow bottoms 18 and 19 with plow bottoms of a smaller size, all that the operator has to do is to remove the pin or block 145 and swing the shiftable plow beam 11 forwardly and laterally toward the plow beam 12, which movement is easily accomplished since the three bails or links 22, 24 and 25 guide the plow beams and the shiftable plow beam 11 is supported on the swinging bails and/or the bracket 66. When thus adjusting the plow for a more narrow width of cut, the front end of the plow beam 11 swings forwardly and laterally to the left, sliding along the cross bar 103 and at the same time swinging the latter in a generally forward direction about the pivot bolt 104. This swinging of the hitch structure 101 is so arranged that the front end 118 thereof swings laterally to the left to accommodate the new width of cut so that with the new width of cut, the plow hitched to the tractor without changing the drawbar position of the latter will operate properly with the right wheel 5 of the tractor adjacent the furrow wall $L^2$ (Figure 3) formed on the previous round. Figure 3 illustrates the positions in which the parts are disposed when the width of cut has been reduced, for example, from 14 inches for each bottom, or a total width of 28 inches, to a width of 9 inches for each bottom, or a total width of 18 inches. The total reduction in the width of cut is, therefore, 10 inches, and therefore the parts are so arranged that when this adjustment of the plow beams is made, the front end of the hitch 118 swings laterally to the left a distance of substantially 10 inches, which is twice the lateral amount of shift (five inches) of the beam 11 in reducing the cut of each bottom from 14 inches to 9 inches. When reducing the width of cut, as by swinging the plow bottom 11 toward the plow bottom 12, when the desired position is reached, the pin or block 145 is reinserted in one of the holes 111, thus locking the plow beams against relative movement and retaining the plow in its new position.

It will be remembered that the transverse bracket 66, together with the two crank axles 63 and 75 mounted for swinging movement thereon, is carried, in effect, wholly by the plow beam 12. Therefore, when the plow beam 11 is shifted through its entire range of adjustment, from the position shown in Figure 2 to the position shown in Figure 3, if the furrow wheel 62 is not readjusted, it may be in such a position as to run, not in the previously opened furrow, but laterally outwardly thereof to the right and on the previously plowed ground. This would result in defective operation, and therefore, when major readjustments are made, such as are illustrated in Figures 2 and 3, it may be necessary to shift the position of the furrow wheel 62. This may be done easily and conveniently by removing the bolts 85 and shifting the wheel 62 from the position shown in Figure 2, and also in full lines in Figure 5, to the position shown in dotted lines in Figure 5, that is, turning the wheel around and bolting it on the inside of the flange 92 (dotted lines, Figure 5) instead of with the wheel tread extending outwardly and bolted to the outside of the flange 92. As illustrated in Figure 3, this readjustment of the furrow wheel 62 is sufficient to cause the wheel to run in the previously opened furrow and substantially directly behind the rear wheel of the tractor 5, although the plow as a whole has been shifted, relative to the tractor, to the right so as to accommodate the reduced width of cut.

The present invention is not concerned with the details of the power lift clutch 162, and it is sufficient to note that it is of the self-interrupting type, under the control of a trip lever 161. The clutch 162 reacts when raising the plow against an adjusting lever 163 which is pivoted at 164 (Figure 1) to a sector 165 that is bolted to the left hand plow beam 12. In order to effect a connection between the hand lever 163 and the clutch mechanism, a link 167 is pivoted, as at 168, to the hand lever 163 and at its lower end is connected with the clutch mechanism in the usual manner. It will be observed that, while the present invention is not concerned with the details of the clutch, it is an important feature of this invention to so construct the plow that the beam 12 on which the bracket 66 carrying the two crank axles is fixed permanently to the plow beam. This automatically disposes the hand lever 163 in what may be termed a constant position relative to the clutch mechanism, while all of the relative movement that occurs between the two plow beams 11 and 12 actually takes place through the plow beam 11 moving toward or away from the plow beam 12 without disturbing the relation between the plow beam 12, the clutch 162 and the adjusting lever 163 therefor.

For leveling the plow, I provide the usual leveling lever 171 and associated connecting linkage connecting the two journal sections 65 and 76 of the crank axles, but since the present invention is not concerned with the particular details of this mechanism, the same has not been described. The spring arrangement acting between the plow beams and the hitch is substantially the same as shown in the U. S. patent to Carl G. Strandlund, No. 1,901,134, issued March 14, 1933, and the clutch mechanism 162, particularly the connection between the latter and the adjusting lever is substantially the same as shown in the patent to Carl G. Strandlund, 2,111,821, dated March 22, 1938.

While I have shown and described above, the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A gang plow comprising a pair of plow beams, bracket means fixed to one of said plow beams and extending laterally across the other beam, means for connecting the other plow beam with said one plow beam for movement toward and away from the latter and also relative to said bracket means, a pair of crank axles having journal sections rockably mounted on said bracket means independently of said other plow beam and generally laterally outwardly extending wheel receiving sections at opposite sides of said plow beams, a land wheel journaled on the crank axle adjacent said one plow beam, a furrow wheel journaled on the other crank axle, means for causing said crank axles to swing together, an adjustable part mounted on said one plow beam to which said bracket means is connected and operatively connected to the land wheel crank axle, and means for transmitting draft to the forward ends of both of said plow beams irrespective of the lateral position of said other plow beam relative to said one plow beam.

2. The invention set forth in claim 1, further characterized by a power lift clutch driven from said land wheel and mounted on said land wheel crank axle, and means connected between said power lift clutch and the adjustable part on said one plow beam for adjusting the operating position of said plow bottoms.

3. A gang plow comprising a pair of plow beams disposed alongside one another, each of said plow beams having a plow bottom fixed thereto, and links connecting said plow beams so that one may swing toward or away from the other, said links being spaced in a generally fore and aft direction and the link adjacent the forward portions of said plow bottoms having downturned ends serving as vertical spindle sections, and coulters mounted thereon, each coulter having a bushing member disposed on the associated spindle section for lateral swinging movement.

4. A gang plow comprising a pair of plow beams disposed alongside one another, each of said plow beams having a plow bottom fixed thereto, and links connecting said plow beams so that one may swing toward or away from the other, said links being spaced in a generally fore and aft direction and the link adjacent the forward portions of said plow bottoms having downturned ends disposed in vertical longitudinal planes passing closely adjacent the landside portions, respectively, of said plow bottoms, and coulters mounted on the ends of said forward link.

5. A gang plow comprising a pair of plow beams, bracket means fixed to one of said plow beams and extending laterally across the other beam, means for connecting the other plow beam with said one plow beam for movement toward and away from the latter and also relative to said bracket means, crank axle means having journal sections rockably mounted on said bracket means independently of said other plow beam and generally laterally outwardly extending wheel receiving sections at opposite sides of said plow beams, a land wheel journaled on the crank axle means adjacent said one plow beam, a furrow wheel journaled on the crank axle means adjacent the other plow beam, an adjustable part mounted on said one plow beam to which said bracket means is connected and operatively connected to said crank axle means, and means for transmitting draft to the forward ends of both of said plow beams irrespective of the lateral position of said other plow beam relative to said one plow beam.

CARL G. STRANDLUND.

REFERENCES CITED

The following references are of record in the file of this patent:

UNITED STATES PATENTS

| Number | Name | Date |
|---|---|---|
| Re. 2,221 | Burton | Apr. 10, 1866 |
| 213,623 | Clayton | Mar. 25, 1879 |
| 465,914 | Bishman | Dec. 29, 1891 |
| 739,814 | Beauvais | Sept. 29, 1903 |
| 836,773 | Moore | Nov. 27, 1906 |
| 1,189,982 | McKay | July 4, 1916 |
| 1,413,281 | Krotz | Apr. 18, 1922 |
| 1,486,385 | Krotz | Mar. 11, 1924 |
| 1,685,321 | Groenke | Sept. 25, 1928 |
| 1,901,134 | Strandlund | Mar. 14, 1933 |

FOREIGN PATENTS

| Number | Country | Date |
|---|---|---|
| 18,191 | Germany | May 17, 1882 |
| 46,098 | Germany | Feb. 14, 1889 |
| 725,515 | France | Feb. 15, 1932 |